United States Patent [19]

Nakamura

[11] Patent Number: 4,899,713
[45] Date of Patent: Feb. 13, 1990

[54] FUEL INJECTION CONTROL SYSTEM FOR AN AUTOMOTIVE ENGINE

[75] Inventor: Mitsuo Nakamura, Tokyo, Japan

[73] Assignee: Fuji Jukogyo Kabushiki Kaisha, Tokyo, Japan

[21] Appl. No.: 309,845

[22] Filed: Feb. 9, 1989

[30] Foreign Application Priority Data

Feb. 24, 1988 [JP] Japan .................. 63-041575

[51] Int. Cl.$^4$ .................. F02P 5/15; F02P 41/26; F02D 25/00; F02D 41/10
[52] U.S. Cl. .................. 123/478; 123/486; 364/431.05
[58] Field of Search .............. 123/478, 486, 339, 480, 123/417; 364/431.05

[56] References Cited

U.S. PATENT DOCUMENTS

| | | | |
|---|---|---|---|
| 4,705,001 | 11/1987 | Danno et al. | 123/417 |
| 4,747,387 | 5/1988 | Takao et al. | 123/478 X |
| 4,782,806 | 11/1988 | Hatanaka | 123/486 |
| 4,831,537 | 5/1989 | Scarnera et al. | 364/431.05 |
| 4,836,164 | 6/1989 | Morazumi et al. | 123/339 |
| 4,836,169 | 6/1989 | Ishikama et al. | 123/480 |

FOREIGN PATENT DOCUMENTS 60-3448  1/1985  Japan .

Primary Examiner—Raymond A. Nelli
Attorney, Agent, or Firm—Martin A. Farber

[57] ABSTRACT

Average pressure of pressure in an intake passage is calculated. A basic injection quantity is determined by engine speed and the average pressure. On the other hand, estimated pressure is estimated from engine speed and throttle position. A correcting coefficient is obtained from the average pressure and the estimated pressure, and the basic injection quantity is corrected with the correcting coefficient.

3 Claims, 7 Drawing Sheets

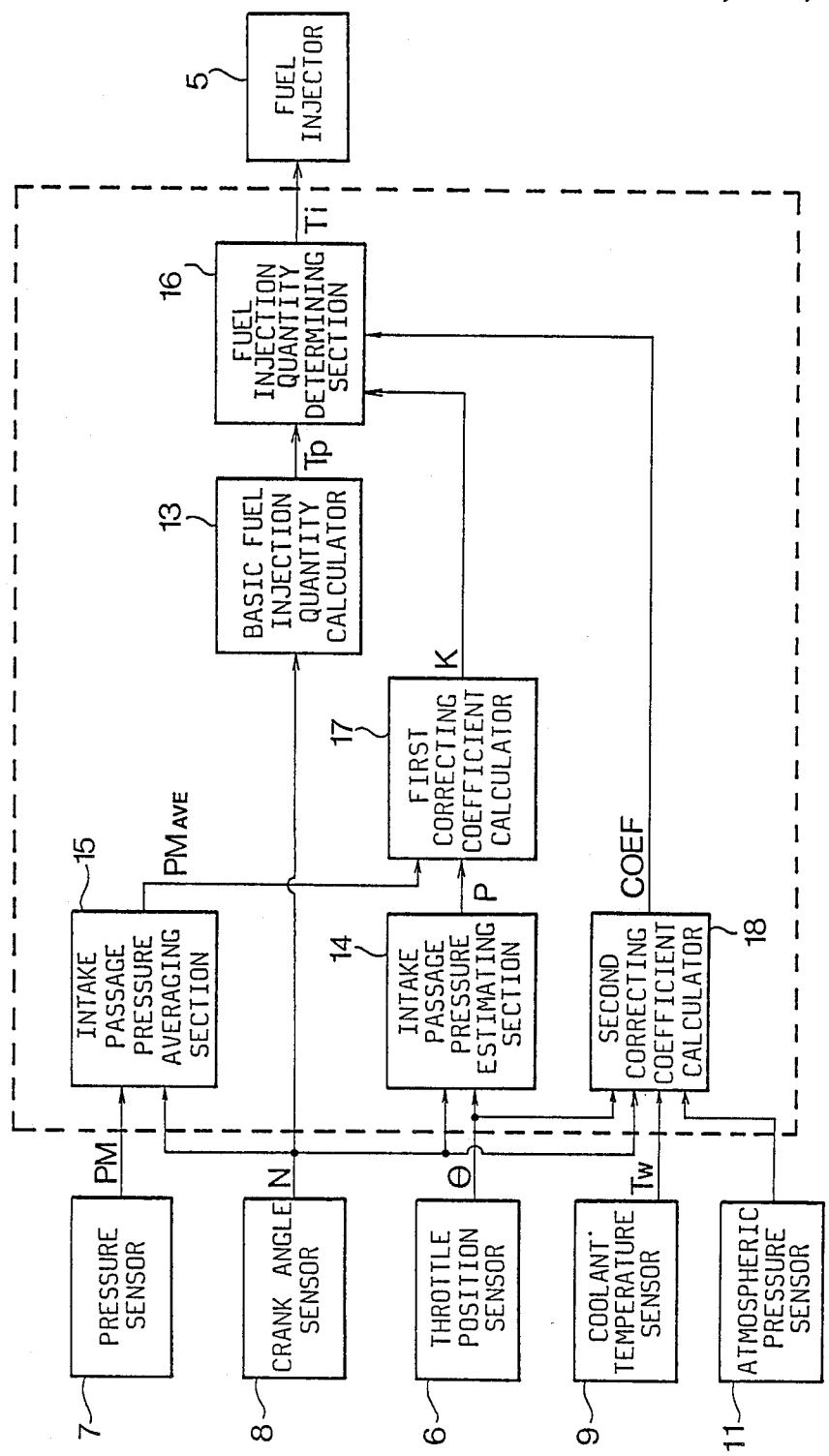

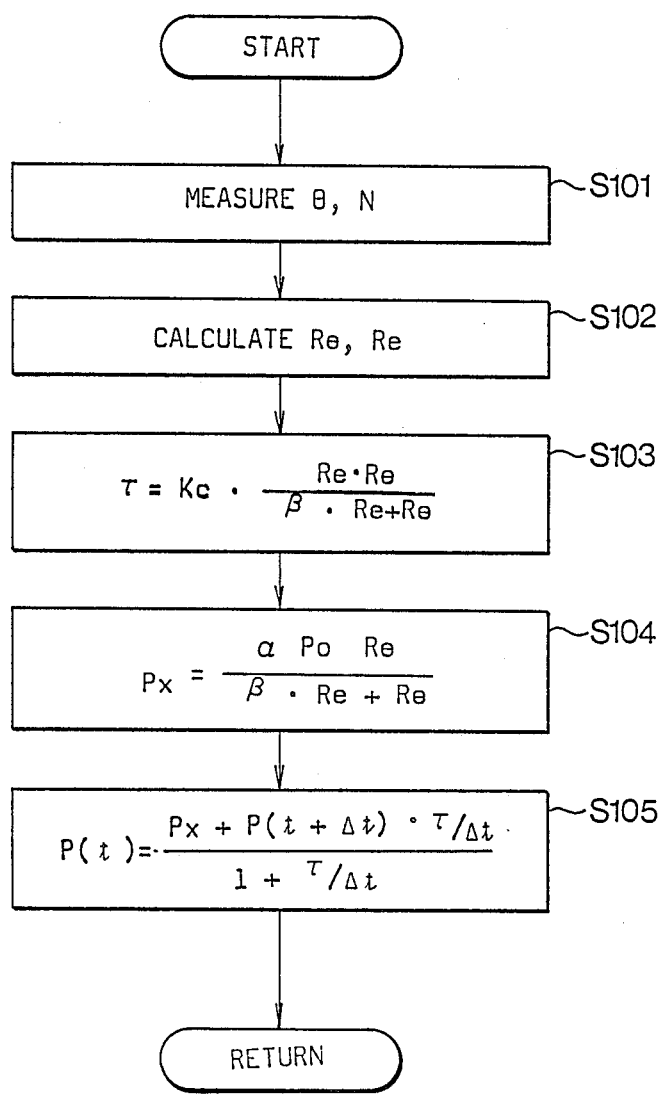

FUEL INJECTION CONTROL SYSTEM FOR AN AUTOMOTIVE ENGINE

BACKGROUND OF THE INVENTION

The present invention relates to a system for controlling the fuel injection in an automotive engine in accordance with engine operating conditions.

In a known fuel injection system, basic fuel injection quantity Tp is calculated in dependency on absolute pressure in an intake passage of the engine and engine speed. A pressure sensor is provided downstream of a throttle valve in the engine for detecting the absolute pressure in the intake passage. The engine speed is detected by a crank angle sensor. In accordance with output signals from these sensors, the basic fuel injection quantity Tp is determined. Actual fuel injection quantity Ti is obtained by correcting the basic fuel injection quantity Tp in accordance with engine operating conditions such as coolant temperature and throttle opening degree.

However, the absolute pressure in the intake passage oscillates because of pulsation of intake air. Consequently, the basic fuel injection quantity Tp varies in accordance with the pulsation. Thus, the operation of the engine becomes unstable, particularly at low engine speed.

Japanese Patent Application Laid-Open 60-3448 discloses a fuel injection control system. In the system, pressure in the intake passage is sampled at a first timing synchronizing with rotation of a crankshaft of an engine, and further sampled at a second timing having a shorter period than the first timing. The sampled pressures are averaged to obtain a first average pressure and a second average pressure. The first and second mean pressures are selected in accordance with engine operating conditions. In dependency on the engine speed and the selected pressure value, the basic fuel injection quantity Tp is calculated.

However, at a transient state of the operation of the engine, the average pressure $PM_{AVE}$ are based on the pressure PM is produced with a delay with respect to the requirement of the engine operation, as shown in FIG. 7. As a result, fuel injection quantity deviates from a necessary quantity.

SUMMARY OF THE INVENTION

The object of the present invention is to provide a fuel injection control system which may provide proper fuel injection quantity without deviation from a necessary quantity.

In the system of the present invention, the pressure in the intake passage is estimated from engine speed and throttle position. The estimated pressure is compared with average pressure of actual intake passage pressures for calculating a correcting value, and basic fuel injection quantity is corrected with the correcting value.

According to the present invention, there is provided a system for controlling fuel injection of an engine for a motor vehicle having an intake passage, a throttle valve provided in the intake passage, and a fuel injector for injecting fuel by a quantity determined by the system.

The system comprises an engine speed sensor producing an engine speed signal dependent on speed of the engine, a throttle position sensor producing a throttle position signal dependent on the opening degree of the throttle valve, a pressure sensor producing a pressure signal dependent on pressure in the intake passage, first calculator means for averaging pressures represented by the pressure signal and for producing an average pressure signal; estimating means responsive to the engine speed signal and the throttle position signal for estimating pressure in the intake passage and for producing an estimated pressure signal, means responsive to the average pressure signal and the estimated pressure signal for producing a correcting signal, second calculator means responsive to the engine speed signal and the average pressure signal for producing a basic fuel injection quantity signal, and corrector means for correcting the basic fuel injection quantity signal with the correcting signal, for determining the quantity of fuel to be injected.

The other objects and features of this invention will become understood from the following description with reference to the accompanying drawings.

BRIEF DESCRIPTION OF DRAWINGS

FIG. 3 is a block diagram showing a fuel injection control system of the control unit;

FIG. 5 is a flowchart showing a calculation routine for the fuel injection control;

DETAILED DESCRIPTION OF THE PREFERRED EMBODIMENT

Figure 1:
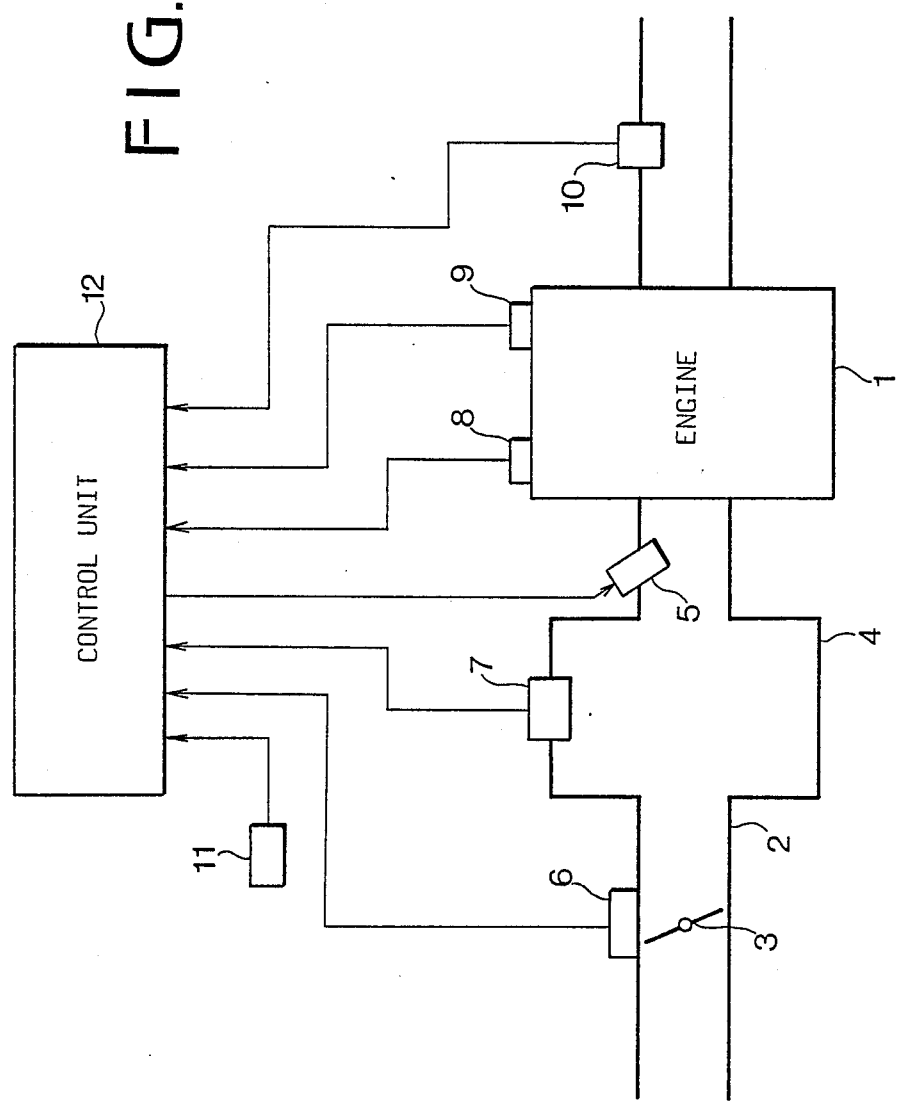
FIG. 1 is a schematic diagram showing a system according to the present invention.

Referring to FIG. 1, in an intake passage 2 of an engine 1, a throttle chamber 4 is provided downstream of a throttle valve 3 so as to absorb the pulsation of intake air. Multiple fuel injectors 5 are provided in the intake passage 2 at adjacent positions of intake valve so as to supply fuel to each cylinder of the engine 1. A throttle position sensor 6 is provided on the throttle valve 3. A pressure sensor 7 is provided in the throttle chamber 4 for detecting the pressure in the intake passage. A crank angle sensor 8 and a coolant temperature sensor 9 are provided on the engine 1, and an $O_2$-sensor 10 is provided in an exhaust passage. An atmospheric pressure sensor 11 is provided for detecting atmospheric pressure. Output signals of the sensors for detecting respective conditions are applied to a control unit 12 comprising a microcomputer to operate the fuel injectors 5.

Figure 2:
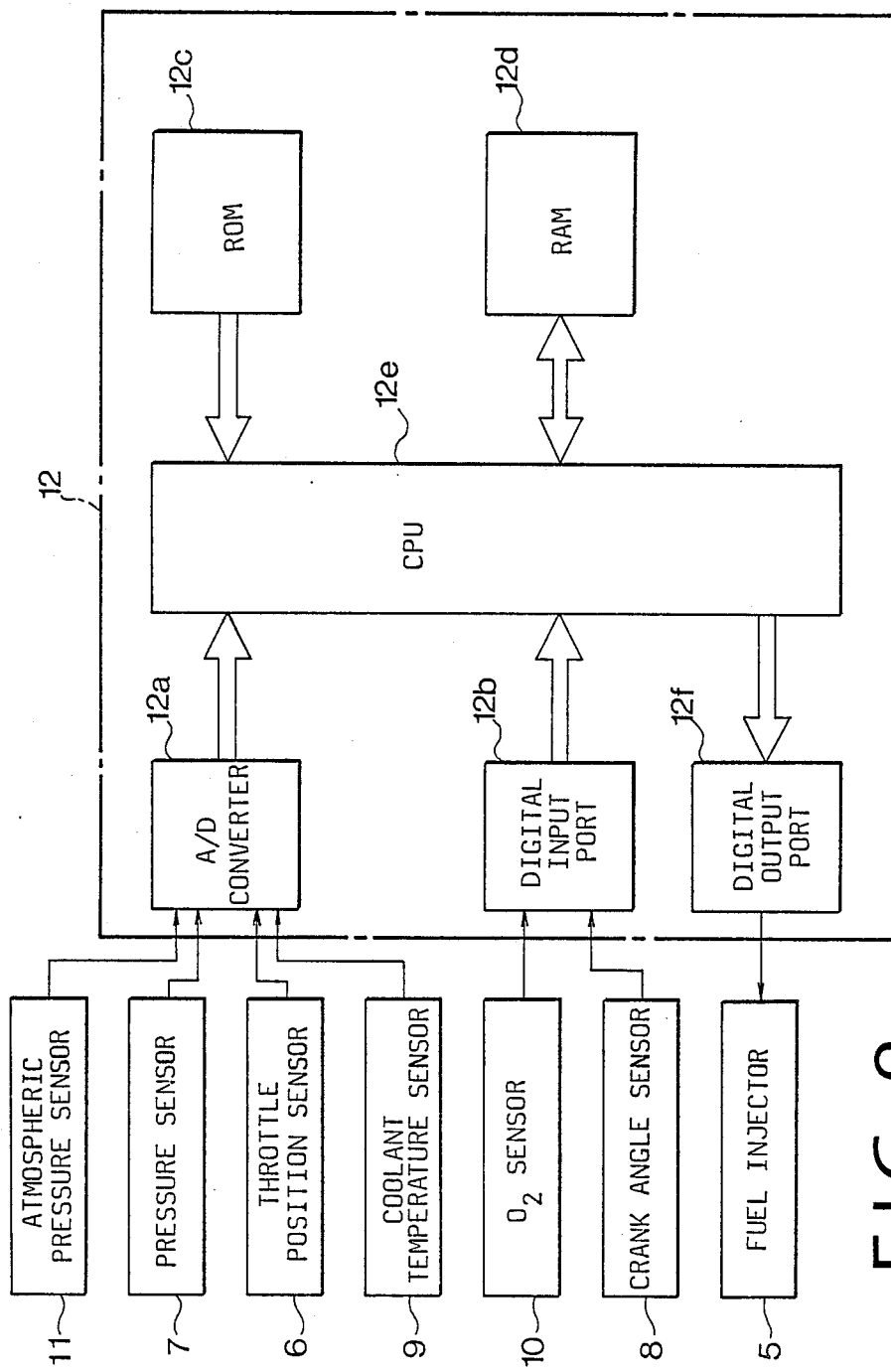
FIG. 2 is a block diagram showing a control unit of the present invention.

Referring to FIG. 2, the control unit 12 comprises an A/D converter 12a supplied with signals from the pressure sensor 7, throttle position sensor 6, coolant temperature sensor 9 and atmospheric pressure sensor 11. A digital input port 12b is supplied with signals from the crank angle sensor 8 and $0_2$-sensor 10. Output signals from the A/D converter 12a and input port 12b are applied to a central processor unit (CPU) 12e. The CPU 12e operates to proceed these signals in accordance with data and programs stored in a read only memory (ROM) 12c and a random access memory (RAM) 12d and produces a control signal which is applied to a digital output port 12f for driving fuel injectors 5.

Referring to FIG. 3 showing a fuel injection control system, engine speed N calculated in the crank angle sensor 8 is applied to a basic fuel injection quantity (pulse width) calculator 13 and an intake passage pressure estimating section 14. A top dead point signal derived from the crank angle signal is applied to an intake passage pressure averaging section 15 to which an intake passage pressure PM from the sensor 7 is applied.

In the intake passage pressure averaging section 15, the intake passage pressure PM is sampled at a short sampling cycle and sampled pressures are averaged at every cycle dependent on the top dead point signal through a weighted mean method for obtaining an average pressure $PM_{AVE}$ by the following equation.

$$PM_{AVE}(t) = a \cdot PM_{AVE}(t-1) + (1-a)PM(t)$$

where a is weight. Accordingly, influence of oscillation of the absolute pressure in the intake passage can be eliminated.

The average pressure $PM_{AVE}$ is applied to the basic fuel injection quantity calculator 13. The calculator 13 calculates a basic fuel injection quantity Tp based on the average pressure $PM_{AVE}$ and the engine speed N, using data derived from the table in the ROM 12c. The basic injection quantity Tp is applied to a fuel injection quantity determining section 16.

The intake passage pressure estimating section 14 estimates an estimation pressure P in accordance with the throttle opening degree $\theta$ obtained from the throttle position sensor 6 and the engine speed N with a predetermined model equation. The model equation is obtained from an equivalent circuit shown in FIG. 4b for the intake system shown in FIG. 4a.

Figure 4A:
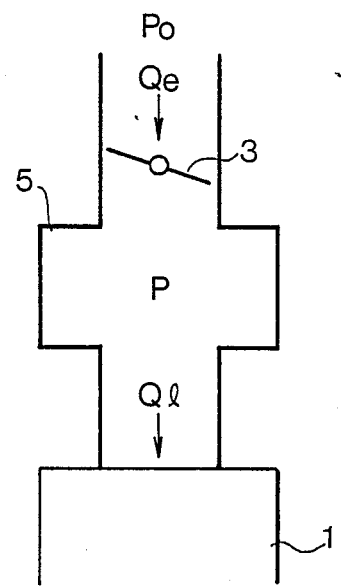
FIGS. 4a and 4b are schematic views of an intake system.
Figure 4B:
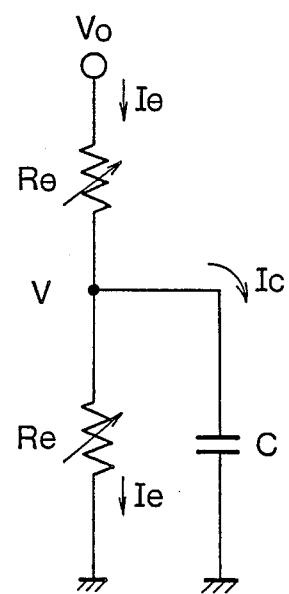

The intake system schematically illustrated in FIG. 4a approximately equals to the electric circuit of FIG. 4b. Namely, Po represents a pressure at upstream of the throttle valve 3 and corresponds to the voltage Vo in FIG. 4b. The pressure P in the intake passage 2 at downstream of the throttle valve 3 and chamber 5 corresponds to the voltage V and a quantity $Q_\theta$ corresponds to the current $I_\theta$ in FIG. 4b. Reference Qe represents actual quantity of air inducted in the cylinder of the engine 1 and corresponds to the current Ie. The current Ic represents a delay of response at the transient state of the engine. A resistance Re and a capacitance C are factors for the delay of response. The model equation is expressed as follows.

$$C \cdot dV/dt = (Vo - V)/R_\theta - V/Re$$

$$V = \{Re/(R_\theta + Re)\} \times Vo \times (1 - e^{-t/\tau})$$

$$\tau = C \times R_\theta \cdot Re/(R_\theta + Re)$$

In other word, it will be seen that the intake passage pressure P is estimated in accordance with engine speed N and throttle opening degree $\theta$.

The estimated pressure P from the section 14 is applied to a first correcting coefficient calculator 17 to which the average pressure $PM_{AVE}$ is applied. The section 17 calculates a correcting coefficient (correcting quantity) K based on the estimated pressure P and the average pressure $PM_{AVE}$. The coefficient K is applied to the fuel injection quantity determining section 16.

Coolant temperature TW obtained from the sensor 9, atmospheric pressure from the sensor 11, and other signals $\theta$ and N from sensors 6 and 8 are applied to a second correcting coefficient calculator 18 where a miscellaneous correction coefficient COEF is calculated. The coefficient COEF is applied to the fuel injection quantity determining section 16 in which an injection quantity Ti is calculated through an equation $Ti = Tp \cdot K \cdot COEF$. An output signal representing the quantity Ti is applied to the injectors 5 as a fuel injection pulse width.

The calculation for determining the estimated pressure P in the operation of the system is described with reference to the flowchart shown in FIG. 5. At a step S101, the throttle valve opening degree $\theta$ is obtained from the output signal of throttle position sensor 6, and engine speed N is calculated based on the output signal of crank angle sensor 8. At a step S102, the resistances $R_\theta$ and Re are derived from lookup tables in accordance with throttle opening degree $\theta$ and the engine speed N. At a step S103, the time constant $\tau$ for the response delay is calculated. At steps S104 to S105, calculations are performed and the estimated pressure P is obtained. In the equations described in the flowchart, Kc, $\alpha$, and $\beta$ are constants, respectively.

Figure 6:
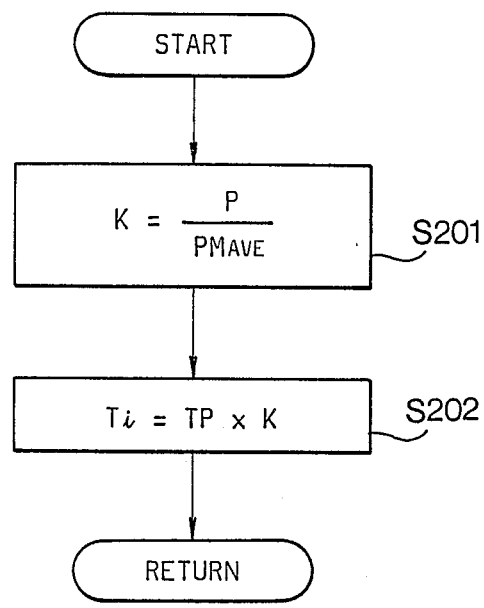
FIG. 6 is a flowchart showing a calculation routine for determining a fuel injection quantity.
Figure 7:
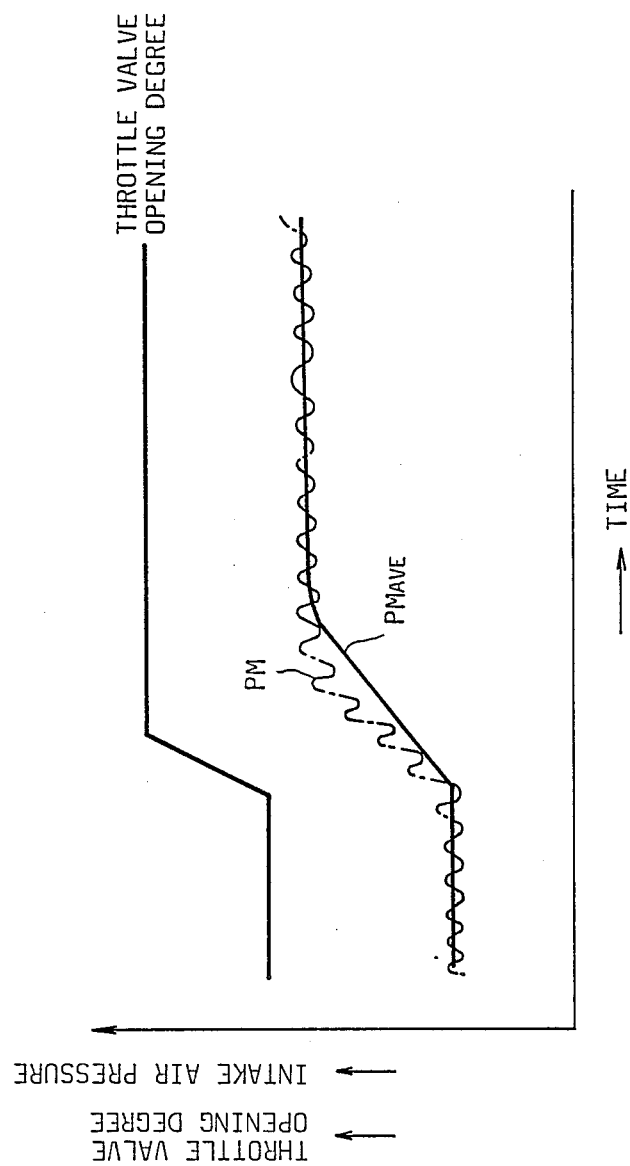
FIG. 7 is a graph showing a relationship between throttle opening degree and intake passage pressure.

FIG. 6 shows the flowchart for calculating the fuel injection quantity Ti. At a step S201, the correcting coefficient K is calculated based on the estimated pressure P and the average pressure $PM_{AVE}$. At a step S202, the basic fuel injection quantity Tp is corrected with the correcting coefficient K.

In the present invention, since the basic injection quantity is corrected with the correcting coefficient calculated based on average pressure and estimated pressure, proper quantity of fuel is injected without response delay.

While the presently preferred embodiment of the present invention has been shown and described, it is to be understood that this desclosure is for the purpose of illustration and that various changes and modifications may be made without departing from scope of the invention as set forth in the appended claims.

What is claimed is:

1. A system for controlling fuel injection of an engine for a motor vehicle having an intake passage, a throttle valve provided in the intake passage, and a fuel injector for injecting fuel by a quantity determined by the system, the system comprising:
    an engine speed sensor producing an engine speed signal dependent on speed of the engine;
    a throttle position sensor producing a throttle position signal dependent on opening degree of the throttle valve;
    a pressure sensor producing a pressure signal dependent on pressure in the intake passage;
    first calculator means for averaging pressures represented by the pressure signal and for producing an average pressure signal;
    estimating means responsive to the engine speed signal and the throttle position signal for estimating pressure in the intake passage and for producing an estimated pressure signal;
    means responsive to the average pressure signal and the estimated pressure signal for producing a correcting signal;
    second calculator means responsive to the engine speed signal and the average pressure signal for producing a basic fuel injection quantity signal; and
    corrector means for correcting the basic fuel injection quantity signal with the correcting signal, for determining the quantity of fuel to be injected.

2. The system according to claim 1 wherein the engine speed sensor is a crank angle sensor.

3. The system according to claim 1 wherein the correcting signal is a coefficient.

* * * * *